Jan. 23, 1962  H. W. WELSH  3,018,085
FLOATING LABYRINTH SEAL
Filed March 25, 1957                                      2 Sheets-Sheet 1

INVENTOR.
BY Harvey W. Welsh
Paul Fitzpatrick
ATTORNEY

Jan. 23, 1962 H. W. WELSH 3,018,085
FLOATING LABYRINTH SEAL
Filed March 25, 1957 2 Sheets-Sheet 2

INVENTOR.
BY Harvey W. Welsh
Paul Fitzpatrick
ATTORNEY

United States Patent Office 3,018,085
Patented Jan. 23, 1962

3,018,085
FLOATING LABYRINTH SEAL
Harvey W. Welsh, Indianapolis, Ind., assignor to General Motors Corporation, Detroit, Mich., a corporation of Delaware
Filed Mar. 25, 1957, Ser. No. 649,588
17 Claims. (Cl. 253—39)

My invention is directed to improving labyrinth seal structures. Labyrinth seals are widely used in fluid dynamic machines, such as compressors and turbines, to provide the most adequate practicable sealing between the rotating and stationary parts of the machines. In an axial flow compressor, for example, such seals are ordinarily provided between the rotor and stator at each stator blade stage and at the inlet and outlet ends of the rotor. Additional seals may be provided for balance pistons and for other purposes. Because of the large diameters of the moving parts and their high speed of rotation, a contact type seal cannot be used. Leakage is minimized by the labyrinth seals, the effectiveness of which depends in great measure upon the narrowness of the gap between the relatively moving parts.

The sealing problem is particularly acute in compressors and turbines of aircraft gas turbine engines where the sizes often are large (the seals being from a foot to a yard in diameter), temperature changes between nonoperating and operating conditions of the engine are great, and the stator structures lack the high degree of rigidity which is possible in stationary power plants because all unnecessary weight must be eliminated.

Slight warping or distortion of the light weight structures of a large axial-flow compressor may force a contact between the labyrinth seal parts unless the clearances are initially made undesirably large.

The principal feature of labyrinth seal structures according to my invention is that one of the cooperating seal parts is mounted so that it can shift slightly so that any contact with the other seal part will cause movement such as to center the two parts and relieve the contact between them. For structural reasons, the stationary part of the seal is the one which is shiftably mounted. This has the important advantage when the seal is mounted on a stator blade ring of a compressor that the mounting frees the seal ring from the blade ring to such an extent that deflection of the blades by gas loads when the compressor is operating is not transmitted to the seal so as to vary the clearance of the seal, as it does when the seals are fixed to the blade rings.

The primary objects of the invention are to improve the performance of fluid dynamic machines, to provide an improved labyrinth seal which is not subject to rubbing or cocking because of distortion of the structure on which it is mounted, and to provide a labyrinth seal ring structure which is readily fabricated with accuracy and is convenient to install in an axial-flow machine.

The nature of the invention and the advantages thereof will be apparent to those skilled in the art from the succeeding specification describing in detail preferred embodiments of the invention and the accompanying drawings.

Figure 1:
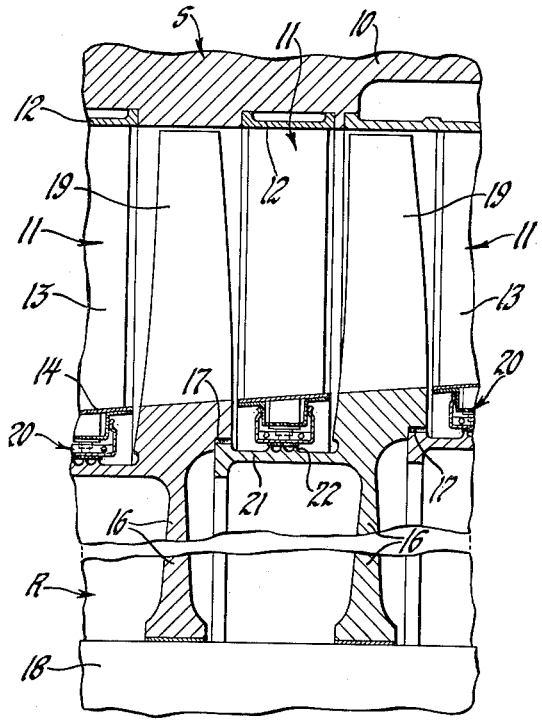
FIGURE 1 is a fragmentary section of an axial-flow compressor taken on a plane containing the axis of the compressor.
Figure 2:
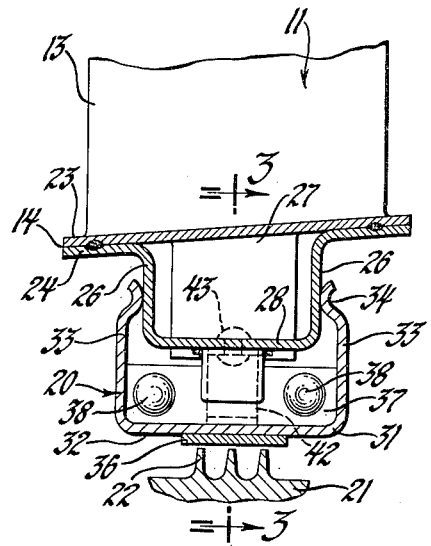
FIGURE 2 is an enlarged view of a portion of FIGURE 1 taken on the plane indicated on the line 2—2 in FIGURE 3.
Figure 3:
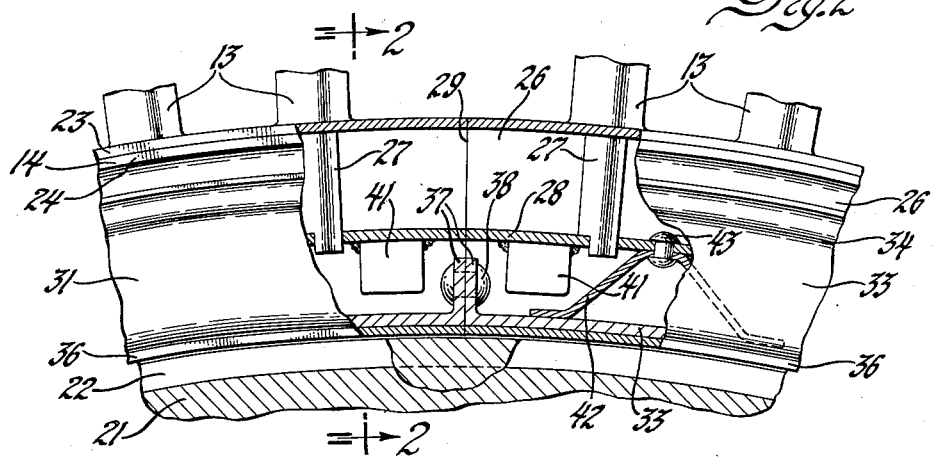
FIGURE 3 is a fragmentary transverse view, with parts cut away and in section, taken on the plane indicated by the line 3—3 in FIGURE 2.

Referring first to the form of the invention shown in FIGURES 1 to 3, FIGURE 1 illustrates the improved seal installed as an interstage seal in an axial-flow compressor of known type. The compressor comprises a stator S and a rotor R rotatably mounted in the stator by suitable bearings (not shown). The stator comprises a case 10 which may be substantially cylindrical and rows or rings of stator vane assemblies 11. Each stator vane assembly is an annular assembly made in two semicircular sections for assembly of the compressor. Each stator ring comprises an outer shroud ring 12 mounted in the case, a number of radial vanes 13, and an inner shroud ring 14.

The rotor comprises a number of disks or wheels 16 abutting and splined together at 17 at the rims and held in assembled relation by a central shaft or tie bolt 18. Each disk 16 mounts a number of blades 19. Each disk includes a flange or ring 21 which constitutes the internal or rotating part of the interstage labyrinth seal indicated generally as 20. Circumferential ribs 22 on the ring 21 provide the labyrinth.

Referring now to FIGURES 2 and 3, the inner shroud ring 14 comprises two rings brazed or welded together, a conical ring 23 which provides the shroud surface or inner boundary of the gas path and a ring 24 of hat section. The spaced walls 26 of the ring 24 define a flange extending radially inwardly. Each blade 13 includes a tang 27 which extends through ring 23 and the web 28 of ring 24 and may be welded or brazed to them. FIGURE 3 illustrates at 29 one of the two split lines between the semi-circular sections of the shroud ring 14.

The outer or stationary seal ring 31 of the labyrinth seal is a channel with a web 32 and flanges 33 extending outwardly and clasping the flange 26 of the shroud ring. A circumferential bead or web 34 at the margin of flanges 33 provides substantially line contact between flanges 33 and 26. The width of flange 26 is slightly greater than the normal space between beads 34 so that the flanges 33 are sprung out slightly when flange 26 is inserted into the ring 31, with the result that there is frictional engagement between the seal ring 31 and the shroud ring tending to hold it stationary. A wear band or ring 36 may be brazed or otherwise fixed to the inner surface of ring 31 to define the actual sealing surface, which is in close proximity to the ribs 22 on the rotor. Ring 36 may, if desired, be made of a relatively soft metal such as silver or soft aluminum.

The seal ring 31 is made in two semi-circular sections so that it may be mounted over the complete rotor between the blade stages 19. The two sections of the ring are suitably fixed together when the compressor is assembled. One mode of joining the rings is illustrated. A radial flange 37 extends outwardly from each end of the web 32. These flanges 37 are fixed together by two rivets 38.

In the manufacture of the seal ring, the two halves are fixed together and the inner surface of ring 36 is machined to true diameter. The halves are taken apart and riveted together (or attached by other suitable means) after putting them around the rotor seal ring 21. The clearance between ring 36 and ribs 22 will be relatively small. When the rotor is assembled in the compressor case, the seal ring 31 is pushed over one-half of the shroud ring flange 26. When the upper half of the compressor case is put on, the flange 26 of that half of the stator blade ring enters the channel section ring 31. The seal ring 31 is centered by the rotor. If contact occurs due to initial lack of concentricity or because of distortion of the case, the contact shifts the ring 31 in the plane of the ring, by which is meant the central plane of the ring transverse to the compressor axis.

In order to prevent any contact between the seal parts from rotating the ring 31, abutments or stops are provided between this ring and the shroud ring 14. As illustrated in FIGURE 3, this is provided by small bosses 41 welded to the web 28 and projecting on each side of the joined flanges 37. The seal split line need not coincide with that of the stator ring.

An optional feature of the structure, illustrated in FIGURE 3, is a centering spring arrangement which provides a light force tending to center ring 31 with respect to ring 14. This is provided by a number of V-shaped leaf springs 42 fixed by rivets 43 to the inner surface of web 28. These springs are evenly distributed around the axis.

It will be noted that because of the substantial channel ring 31, the outer labyrinth seal is relatively rigid and tends to retain its circular shape. Thus, deformation of the case or other stator structure which disturbs the roundness of the shroud ring 14 merely causes sliding of the shroud ring in the seal ring without deforming the latter. Another important advantage of the installation lies in the fact that the seal clearances are not disturbed by the effects of gas loading on the stator blades. When the compressor is operating, the force exerted by the gas on the blades 13 deflects them axially of the compressor. The blade ring 11 is thereby slightly coned or dished forwardly. As a result, the inner shroud ring is distorted, increasing slightly in diameter at the front edge and decreasing slightly at the rear edge. Where the seal is a part of the shroud ring or is rigidly fixed to it, these changes in diameter are communicated to the labyrinth seal, increasing the clearance toward one end of the seal and decreasing it at the other. The increase of clearance decreases the sealing effect and the decrease of the clearance may cause wear with resulting increase in clearance, With the structure illustrated, the distortion of the inner shroud ring does not distort the seal ring, since the sides of the flange 26 slide inwardly and outwardly in the channel as the shroud ring diameter increases or decreases at these points.

Figure 4:
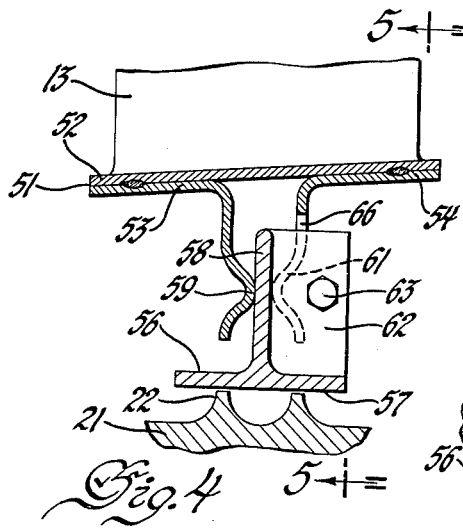
FIGURE 4 is a view corresponding to FIGURE 2 illustrating a second embodiment of the seal, the section being taken on the plane indicated by the line 4—4 in FIGURE 5.
Figure 5:
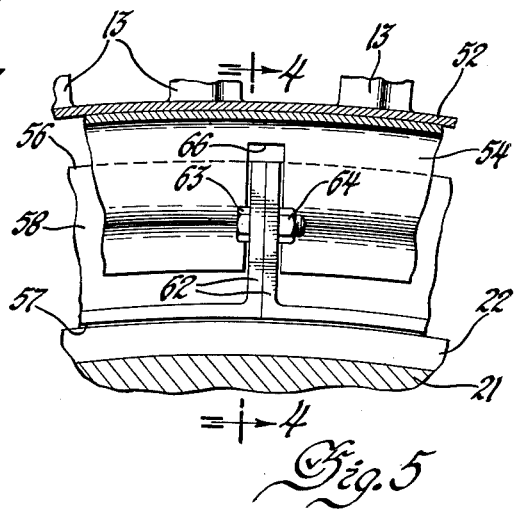
FIGURE 5 is a transverse sectional view taken on the plane indicated by the line 5—5 in FIGURE 4.

FIGURES 4 and 5 illustrate a second embodiment of the invention, likewise shown as an interstage seal. In this structure, the blades 13 may be essentially the same as those previously described and may be mounted in the case in the same way. The inner ends of the blades are fixed to a shroud ring 51 comprising an outer ring 52, which provides the blade shroud, and two flanged or generally L-section rings 53 and 54. It will be understood that ring 51 may be in two semi-circular sections. The stationary seal ring 56 in this case is of T-section with a cylindrical portion 57 forming a seal face and cooperating with the seal ridges 22 on the rotor seal ring 21. The radial portion 58 of the seal ring is held between the annular ridges 59 and 61 on the rings 53 and 54 which spring against the portion 58 to hold it frictionally. Flanges 62 at each end of the sections of the ring 56 are held in abutting relation by a bolt 63 and nut 64. The walls of a slot 66 in the ring 54 lie on each side of the assembled webs 62 with slight clearance such as to permit shifting of the outer seal ring, but preventing any substantial rotation. The installation, operation, and advantages of this seal structure are the same as those previously set out with respect to the structure of FIGURES 2 and 3.

Figure 6:
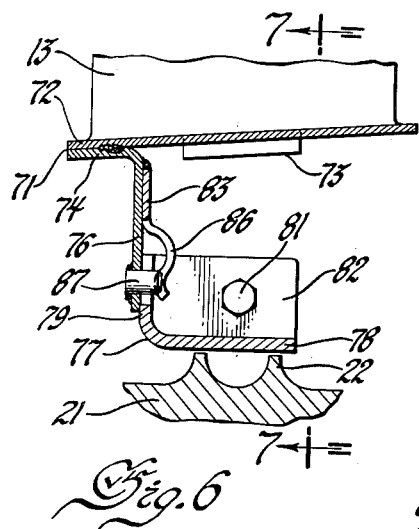
FIGURE 6 is a view corresponding to FIGURE 2 of a third embodiment of the seal, taken on the plane indicated by the line 6—6 in FIGURE 7.
Figure 7:
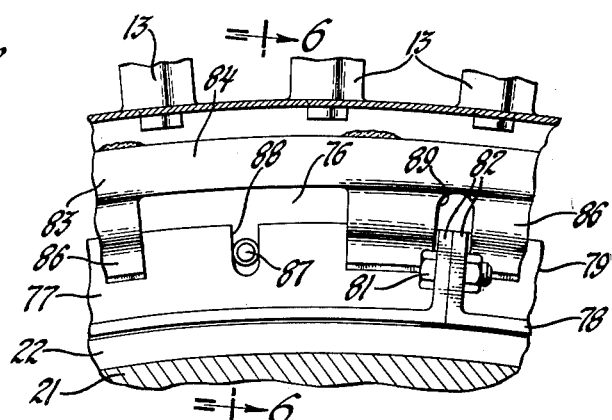
FIGURE 7 is a transverse sectional view taken on the plane indicated by the line 7—7 in FIGURE 6.

FIGURES 6 and 7 illustrate a third form of interstage seal functioning in the same way as those previously described, but involving differences of structure. In this form, the inner shroud ring 71 of the blades 13 comprises a shroud proper 72 through which tangs 73 on the blade extend and to which the blades are rigidly fixed. The shroud ring also includes an L-section ring 74, including a radially and circumferentially extending flange 76, brazed or welded to the ring 72. The seal ring 77 is also L-shaped in cross-section, including cylindrical sealing ring 78 and a radial flange 79. The two halves of ring 77 may be joined by bolts 81 passing through webs 82 at the ends of the segments. The seal ring 77 is retained on the shroud ring by an interrupted spring flange structure 83 comprising a ring 84 brazed or welded to the flange 76 and having spring fingers 86 extending from it and engaging the face of flange 79 to press this flange against flange 76.

Any suitable abutment means may be provided to restrain the ring 77 against rotation. Two are illustrated. Two pins 87 may be fixed in the ring 76 at opposite points and project into notches 88 in the seal ring, the walls of the notch being spaced somewhat from the pin to provide for some lateral shifting as well as radial shifting at the pins. An alternative abutment means may be provided as illustrated in FIGURE 7 in which the webs 82 extend with clearance through a notch 89 in one of the spring fingers 86 or between adjacent spring fingers.

It will be understood that the seals shown in FIGURES 4 to 7 may include a facing ring 36 as shown in FIGURE 2, if desired.

The application of the invention to the mounting of the seals on any fixed part of the compressor other than the blade shrouds may be as shown. Particularly where the seals are at the ends of the rotor, there may be no need to construct them in segments. In this case, a projection such as the webs 37 or 62 may be provided to serve as abutment means without being employed as means for joining the segments of the seal ring.

Also, an abutment means such as the pin and slot arrangement 87 and 88 of FIGURES 6 and 7 may be incorporated in the other two illustrated species of the structure.

Labyrinth ribs such as 22 may be on the outer member of the seal instead of the inner, or may be on both.

It will be apparent to those skilled in the art that the invention eliminates the interference with proper clearance of the seals caused by eccentricity of the case or stator shroud with respect to the rotor or by distortion of the seal due to dishing of the stator blade rings under gas loading. While the structure is necessarily somewhat more complicated than those in which the stationary part of the labyrinth seal is fixed to the stator blade ring, it is relatively simple and light. A further advantage of the structure lies in the fact that the seal ring may be machined to a true circular form independently of the blade ring segments.

The detailed description of the preferred embodiments of the invention for the purpose of explaining the principles thereof is not to be construed as limiting the invention, since many modifications may be made by the exercise of skill in the art within the scope of the invention.

I claim:

1. In a rotary fluid dynamic machine, in combination, a stator ring, a rotor rotatable adjacent the stator ring and coaxial therewith, the rotor including a labyrinth seal member, a closed labyrinth seal ring coaxial with and adjacent to the labyrinth seal member and cooperating therewith to provide a labyrinth seal, means frictionally mounting the seal ring on the stator ring with freedom for translation in a plane normal to the axis of the seal ring, and interengaging abutment means on the seal ring and the stator ring limiting rotation of the seal ring about its axis.

2. A machine as recited in claim 1 in which the means mounting the seal ring on the stator ring comprises a flange on one of the rings and two flanges on the other ring resiliently clasping the first-mentioned flange.

3. A machine as recited in claim 1 in which the seal ring is of channel section having flanges and the flanges of the seal ring clasp the stator ring.

4. A machine as recited in claim 1 in which the seal ring includes a radially and circumferentially extending flange and the stator ring includes parts resiliently clasping the said flange.

5. A machine as recited in claim 4 in which the seal ring is of T-shaped cross-section.

6. A machine as recited in claim 1 in which the seal ring is of L-shaped cross-section with a radially and circumferentially extending flange and the stator ring includes parts resiliently clasping the said flange.

7. In a rotary fluid dynamic machine, in combination, a stator ring, a rotor ring rotatable adjacent the stator ring and coaxial therewith, the rotor ring including a first labyrinth seal ring, a second labyrinth seal ring coaxial with and adjacent to the first labyrinth seal ring and cooperating therewith to provide a labyrinth seal, means frictionally mounting the second seal ring on the stator ring with freedom for translation in a plane normal to the axis of the second seal ring, interengaging abutment means on the second seal ring and the stator ring limiting rotation of the seal ring about its axis, and resilient means connected between the stator ring and the second seal ring biasing the stator ring and the second seal ring toward a coaxial condition.

8. In a rotary fluid dynamic machine, in combination, a stator blade ring, a rotor ring rotatable adjacent the stator blade ring and coaxial therewith, the rotor ring including a first labyrinth seal ring, a second labyrinth seal ring coaxial with and adjacent to the first labyrinth seal ring and cooperating therewith to provide a labyrinth seal, and means mounting the second seal ring on the stator blade ring providing substantially a circular line contact between the said rings with freedom for canting or dishing of the blade ring relative to the seal ring so that canting or dishing of the blade ring is not communicated to the seal ring so as to alter the diameter thereof.

9. A machine as recited in claim 8 in which the mounting means is slidable in a plane normal to the axis of the second seal ring.

10. A machine as recited in claim 8 in which the mounting means comprises a flange on one ring and flanges on the other ring clasping the firstmentioned flange.

11. A rotary fluid dynamic machine comprising, in combination, a stator and a rotor rotatably mounted in the stator, the rotor and the stator being spaced and defining between them an annular fluid flow path, blades on the stator and on the rotor extending into the flow path, a labyrinth seal between the rotor and the stator comprising a part of the rotor and a non-rotating normally stationary part mounted on the stator, the stator blades being connected to an inner shroud ring, the said normally stationary part comprising a seal ring, and a connection between the two said rings providing an annular pivotable joint between the rings so that canting of the blades is not communicated to the seal ring.

12. A machine as recited in claim 11 in which the said connection comprises a flange on one ring and flanges on the other ring clasping the firstmentioned flange and having substantially circular lines of contact with the firstmentioned flange.

13. A rotary fluid dynamic machine comprising, in combination, a stator and a rotor rotatably mounted in the stator, the rotor and stator being spaced and defining between them an annular fluid flow path, blades on the stator and on the rotor extending into the flow path, a labyrinth seal between the rotor and the stator comprising a part of the rotor and a non-rotating normally stationary part mounted on the stator, the stator blades being connected to an inner shroud ring, the said normally stationary part comprising a seal ring, and a connection between the two said rings comprising a first flange on one ring and resilient flanges on the other ring clasping the first flange and slidable bodily thereon in a plate normal to the axis of the seal.

14. A machine as recited in claim 13 in which the first flange is on the shroud ring.

15. A machine as recited in claim 13 in which the first flange is on the seal ring.

16. A machine as recited in claim 13 in which the two said rings have loosely interengaging abutment means thereon limiting relative rotation of the rings about the axis of the seal.

17. A machine as recited in claim 16 in which the seal ring is comprised of segments fixed together.

References Cited in the file of this patent

UNITED STATES PATENTS

| | | |
|---|---|---|
| 2,488,867 | Judson | Nov. 22, 1949 |
| 2,488,875 | Morley | Nov. 22, 1949 |
| 2,598,176 | Johnstone | May 27, 1952 |
| 2,632,626 | McClintock | Mar. 24, 1953 |
| 2,640,319 | Wislicenus | June 2, 1953 |
| 2,686,657 | Kalitinsky | Aug. 17, 1954 |
| 2,702,687 | Ledwith | Feb. 22, 1955 |
| 2,773,711 | Castle et al. | Dec. 11, 1956 |
| 2,812,159 | Krebs | Nov. 5, 1957 |
| 2,851,289 | Pedersen | Sept. 9, 1958 |